2,951,012
POISON IVY REMEDY

Ole Gisvold, 2161 Dudley Ave., St. Paul 8, Minn.

No Drawing. Filed Mar. 3, 1958, Ser. No. 718,494

7 Claims. (Cl. 167—58)

This invention relates to new and novel compositions for treating the skin after it has been exposed to skin irritants such as poison ivy (*Rhus toxicodendron*), poison oak (*Rhus diversiloba*), poison sumac (*Rhus venenata*), and the like. More particularly, this invention relates to compositions useful in the treatment of the dermatitis caused by the vesicant principles of *Rhus toxicodendron*, *Rhus diversiloba*, and *Rhus venenata*, by the use of compositions made up of a mixture of a strong anion exchange resin, an organic base that is non-toxic when applied to the skin, and appropriate diluents and/or solvents for dissolving or suspending the two aforementioned ingredients and diluting them to a proper concentration for application to the affected area of the skin for treatment.

The description of the compositions and the use thereof will be disclosed as a treatment for poison ivy, but it is to be understood that the use of these compositions is not so limited since the invention may be used, for example, for treatment of exposure to poison oak, poison sumac, and other skin irritants. Also, these compositions have a certain preventative value if applied to areas of the skin prior to exposure to the aforementioned skin irritants. It is well known that many people develop a skin irritation from poison ivy (*Rhus toxicodendron*), poison oak (*Rhus diversiloba*), and related forms of plant life and that the resulting irritation is so intense that it causes the subject to scratch the affected areas of the skin, thereby further spreading the area of irritation.

In order to better understand the invention it is desirable briefly to describe the mechanism of the irritation caused by poison ivy.

The toxic principles in poison ivy and the like plants consist mainly of urushiol and related similar compounds. The urushiol

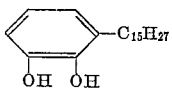

reacts with the protein of the skin to form an organic complex that is fairly stable in the range of the pH of the skin which usually is between pH 3 and pH 5. The aforementioned complex of skin proteins and the toxic plant principles, itself has a vesicant action on the skin that produces pustules (containing toxic fluid), along with a resultant itch. The scratching and breaking of the pustules containing such toxic complex therein, spreads the irritation to other areas of the skin with resultant increase in the area affected. The complex and the resultant itching tend to remain for a prolonged period of time since this complex of skin proteins and toxic plant principles, is not readily metabolized, nor is it readily oxidized since it is for the most part under the surface of the skin.

Prior compositions used for treating skin irritations caused by poison ivy and the like have not been satisfactory since they do not tend to break up the aforementioned stable complex which is formed by the toxic principles of the plant, and the proteinaceous compounds of the skin.

It is an object of the present invention to provide an improved remedy for alleviating and curing irritations caused to the skin by poison ivy, poison oak, poison sumac, and other related chemical toxicants. It is another object of the invention to provide an improved preparation which may be applied externally to the skin of the human patient, either before or after exposure to poison ivy, poison oak, poison sumac, and related plants, for de-activating the toxic principles of the plant, which cause irritation of the skin.

It is another object of the invention to provide an improved preparation for external application to the skin of the human patient for first splitting the complexes of proteins and the toxic principles of plants of the poison ivy, poison oak, poison sumac, and the like families, which complexes are formed upon contact of such toxic principles with the skin, and of their reacting to such principles, in either their original or air oxidized state, into a condition such that the principles are no longer irritants to the skin, and can be removed.

Other and further objects are those inherent in the invention herein illustrated and described in the claims, and will be apparent as the description proceeds.

To the accomplishment of the foregoing and related ends, this invention then comprises the features hereinafter fully described and particularly pointed out in the claims, the following description setting forth in detail such illustrative embodiments of the invention, these being indicative, however, of but a few of the various ways in which the principles of the invention may be employed.

According to this invention there is provided a preparation including a strong anion exchange resin and an organic base which is non-toxic when applied to the skin, said strong anion exchange resin and organic base forming the active ingredients in the preparation. These ingredients are preferably dissolved or suspended in any suitable vehicle, preferably a water miscible solvent, and water, or the active ingredients may be diluted with an inert ointment or inert powder. Benzyl alcohol may be added in that it is beneficial because it has a mild anesthetic action.

When a glycol is used as a solvent it is preferable that an amount of 5%–10% by weight of the composition be used, whereas if an alcohol from the (b) group is used, such can be used in an amount of 70% by weight of the composition.

Examples of the strong base anion exchange resins to be used are insoluble, aromatic, cross linked vinyl copolymers containing substitute groups having the general formula $$-C_nH_{2n}-\underset{\underset{Y}{|}\diagdown R_3}{\overset{R_1}{\underset{|}{N}}}-R_2$$

in which $n$ is an integer of a value 1 to 4, $R_1$, $R_2$ and $R_3$ are hydrocarbon groups, such as alkyl, benzyl or hydroxy alkyl, and Y is an hydroxyl ion. These compounds are described in U.S. Patent No. 2,591,573 and include the strong base anion exchange resins known as Rohm & Haas "Amberlite IRA–400" and "Amberlite IRA–401." Also these resins may be of the strong base quaternary ammonium anion type having cross linkage groups of the general formula where R is alkyl and $R_1$, $R_2$ and $R_3$ are hydrocarbon groups such as alkyl or benzyl or hydroxyalkyl. These latter compounds are described in Dowex: Ion Exchange (1958), Dow Chemical Company, and include the resins known as Dow Chemical "Dowex 1" and "Dowex 2," and other quaternary ammonium resins. Resins of the type referred to above are also described in column 2, lines 1–42 of U.S. Patent No. 2,684,321. Such a strong anion exchange resin which is used in an amount ranging from 5% to 50% by weight of the final composition is mixed with a non-toxic organic base.

Examples of organic bases which are to be used are (a) the ethanol amines (mono-, di-, and tri-), (b) ethylene di-amine or its homologues, (c) piperazine, and (d) di-ethyl amino-ethanol. The amount of organic bases to be used varies from 2% to 10% by weight of the final compositions, the amount depending on the compounds used.

Optional ingredients which may be used as diluents and/or solvents are mono- or di-hydric alcohols of 3–6 carbons, talcum and magnesium oxide. Examples of solvents are (a) propylene glycol and its homologues to 6 carbon atoms, and (b) ethyl alcohol and its homologues to 4 carbon atoms. An aryl alcohol such as benzyl alcohol may optionally be used up to 2% to 5% of the total weight of the mixture. The fourth optional ingredient is water which may be added to give the balance of the weight up to 100%.

The aryl alcohols which may be used are less desirable as a solvent than the other solvents in the groups mentioned since they are not significantly miscible with water. However, a small amount of benzyl alcohol is desirable, as stated herein, but is not essential. Also other solvents such as the mono-, di-, and tri-alcohols are preferred as compared to aryl alcohols since they aid in dissolving the toxic principles of poison ivy and thereby enhance the effectiveness of the remedy.

The strong anion exchange ingredients of the types set forth are usually purchased in the salt form. If purchased in salt form, it is first treated with strong sodium hydroxide to convert it to the base (or anion exchange) form. It is then worked free of alkali, then dried, and is then ground in a ball mill to form a powderlike flour. It is finally ready to be mixed with the organic base and the solvent or diluent.

It is to be understood that the final composition can be made in a powdered form with the active ingredients (i.e. the resin and the base) carried in an inert powder such as talc or magnesium oxide, so as to permit the application of the composition to the skin in powdered form.

Even though all the examples of organic bases recited are liquids, since the amounts used are quite small, said bases would be diluted by the strong anion exchange resin and inert powder so that one would still have a powder.

The following specific examples serve to illustrate various compositions which are the subject matter of this invention and are not in limitation thereof. Examples of preparation:

|   |   |   | Percent |
|---|---|---|---|
| I. | (1) | Amberlite IRA-401 | 8 |
|    | (2) | Tri-ethanol amine | 2 |
|    | (3) | Propylene glycol | 10 |
|    | (4) | Water to balance to 100%. | |
|    |     | Applied: by sponging on affected areas. | |
| II. | (1) | Amberlite IRA-400 | 10 |
|    | (2) | Tri-ethanol amine | 4 |
|    | (3) | Propylene glycol | 20 |
|    | (4) | Water to balance to 100%. | |
|    |     | Applied: same as I. | |
| III. | (1) | Amberlite IRA-401 | 8 |
|    | (2) | Tri-ethanol amine | 2 |
|    | (3) | Ethyl alcohol | 50 |
|    | (4) | Water to balance to 100%. | |
|    |     | Applied: same as I. | |
| IV. | (1) | Amberlite IRA-401 | 50 |
|    | (2) | Tri-ethanol amine | 4 |
|    | (3) | Water to balance to 100%. | |
|    |     | Applied: same as I. | |
| V. | (1) | Dowex 1 | 50 |
|    | (2) | Di-ethanol amine | 2 |
|    | (3) | Propyl alcohol | 20 |
|    | (4) | Water to balance to 100%. | |
|    |     | Applied: same as I. | |
| VI. | (1) | A quaternary ammonia resin | 25 |
|    | (2) | Mono-ethanol amine | 2 |
|    | (3) | Ethyl alcohol | 67 |
|    |     | Applied: same as I. | |
| VII. | (1) | Dowex 2 | 5 |
|    | (2) | Ethylene di-amine | 4 |
|    | (3) | Butylene glycol | 8 |
|    | (4) | Water to balance to 100%. | |
|    |     | Applied: same as I. | |
| VIII. | (1) | Amberlite IRA-400 | 20 |
|    | (2) | Tri-ethanol amine | 2 |
|    | (3) | Talcum to balance to 100%. | |
|    |     | Applied: dusting on the skin. | |
| IX. | (1) | Dowex 1 | 15 |
|    | (2) | Tri-ethanol amine | 4 |
|    | (3) | Magnesium oxide to balance to 100%. | |
|    |     | Applied: same as VIII. | |

A simple mixture of the powdered anion exchange resin, prepared in the manner as herebefore stated, may be made with the amine. These powders can be mixed thoroughly and applied directly to the skin. Such a mixture will achieve noteworthy results. Where the resin and amine are suspended in an aqueous or alcoholic-aqueous solution, as indicated in the aforesaid examples, the evaporation of the water and alcohol will deposit the mixture on the skin. The presence of the water-alcohol carrier is advantageous but not essential to the accomplishment of the purposes of this invention. Likewise the powdered resin and amine may be carried in a finely divided indirect powder such as talcum or magnesium oxide.

However, it is preferred to use the principal ingredients of resin and amine in an aqueous-alcohol carrier.

In use, any of the compositions as described herein, are applied by sponging or dusting the ingredients onto the affected area. The affected area should be cleaned at intervals to remove the products formed by the reaction of the ingredients in the composition with the toxic plant principles. After the affected area has been cleaned, it is again treated by applying the composition thereto until such time as the dermatitis has been cured.

The exact mechanism by which the present invention operates to effect the cure of the aforesaid dermatitis conditions, is not entirely understood, but it is believed to be as follows:

It is believed that the amine base of the composition reacts with the stable organic complex which is formed by the protein of the skin and the toxicant principle (such as urushiol). The reaction of the amine with this complex liberates the toxic principle which is then again present on the skin, and this toxic plant principle is subjected to air-oxidation. These compounds in their oxidized form do not exert a vesicant action. The strong anion exchange resin, however, is capable itself of reacting with the liberated toxic principle and the air-oxidation products of the toxic plant principles, to form insoluble ion exchange salts. These salts are not toxic and while they may be present on the skin, the source of irritation to the skin is accordingly isolated. Such insoluble ion exchange salts may be readily removed from the skin by sponging or gently rubbing the affected area.

In the reaction of this composition with the toxic principles, the amine base acts as a solubilizing agent for the urushiol toxic plant principles, and related vesicants.

In this solubilized state the urushiol (and related vesicants), are more free to react with the strong anion exchange resin to form from the urushiol ion exchange salts therewith. This reaction by which the toxic principles are converted into a non-irritating state, is believed to be enhanced by the water-alcohol vehicles, specified in some of the examples, but such vehicles are not to be regarded as essential to the purposes of the invention. The water-alcohol vehicle does not appear to have a catalytic effect, but apparently the vehicle does make the reactive ingredients of the composition more readily available so as to bring them into contact with the irritant principles, which are to be deactivated.

The compositions herein specified form a buffer solution which maintains the proper pH at the surface of the skin while at the same time reacting with the toxic principles to neutralize them. Even though the compounds set forth in the examples have been listed under trade names, it is to be understood that compounds like those listed under trade names can be as readily used in forming the mixture of this invention.

As many widely apparent different embodiments of this invention may be made wtihout departing from the spirit and scope thereof, it is to be understood that I do not limit myself to the specific embodiments herein.

What I claim is:

1. A composition for treating dermatitis caused by poison ivy, poison oak and poison sumac consisting essentially of from about 5% to about 50% of a finely powdered insoluble basic anion exchange resin selected from the group consisting of aromatic cross linked vinyl copolymers containing substituent groups having the general formula

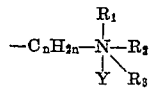

in which $n$ is an integer of a value from one to four; $R_1$, $R_2$, and $R_3$ are selected from the group consisting of lower alkyl, benzyl, and hydroxyalkyl, and Y is a hydroxyl ion, and strong base quaternary ammonium resins containing substituent groups having the general formulae

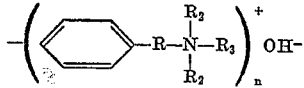

in which R is an alkyl group, and $R_1$, $R_2$ and $R_3$ are selected from the group consisting of lower alkyl, benzyl and hydroxyalkyl groups; from about 2% to about 10% of a soluble organic amine base which is non-toxic when applied to the human skin selected from the group consisting of ethanol amines, ethylene diamines, piperazine and diethylaminoethanol; and a solvent.

2. The composition according to claim 1 wherein the solvent is selected from the group consisting of water, monohydric alcohols having from one to four carbon atoms, polyhydric alcohols having from two to six carbon atoms, and mixtures thereof.

3. The composition according to claim 1 wherein the solvent is propylene glycol.

4. A composition for treating dermatitis caused by poison ivy, poison oak and poison sumac, consisting essentially of at least 5% of a finely powdered insoluble basic anion exchange resin selected from the group consisting of aromatic cross linked vinyl copolymers containing substituted groups having the general formula

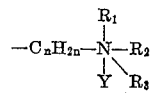

in which $n$ is an integer of a value from one to four; $R_1$, $R_2$, and $R_3$ are selected from the group consisting of lower alkyl, benzyl and hydroxyalkyl, and Y is an hydroxyl ion, and strong base quaternary ammonium resins containing substituted groups having the general formulae

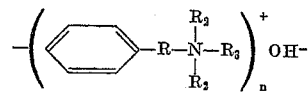

in which R is an alkyl group and $R_1$, $R_2$ and $R_3$ are selected from the group consisting of lower alkyl, benzyl and hydroxyl alkyl groups; and at least 2% of a soluble organic amine base which is non-toxic when applied to the human skin selected from the group consisting of ethanol amines, piperazine and diethylaminoethanol, and ethylene diamines.

5. The composition according to claim 4 further characterized by the inclusion of an inorganic, non-toxic inert powder.

6. The composition according to claim 4 further characterized by the inclusion of a solvent selected from the group consisting of water, monohydric alcohols having from one to four carbon atoms, polyhydric alcohols having from two to six carbon atoms, and mixtures thereof.

7. The composition according to claim 4 further characterized by the inclusion of a propylene glycol as a solvent.

References Cited in the file of this patent

UNITED STATES PATENTS

| | | |
|---|---|---|
| 1,913,631 | Graves | June 13, 1933 |
| 2,501,927 | Block | Mar. 28, 1950 |
| 2,684,321 | Thurmon | July 20, 1954 |

OTHER REFERENCES

Thurmon: J. Investigative Dermatology, vol. 25, No. 1, July 1955, pp. 9–20.

Fiedler: J.A.P.A., Sci. Ed., vol. XLVI, No. 1, pp. 44–51, January 1957.